Figure 1:
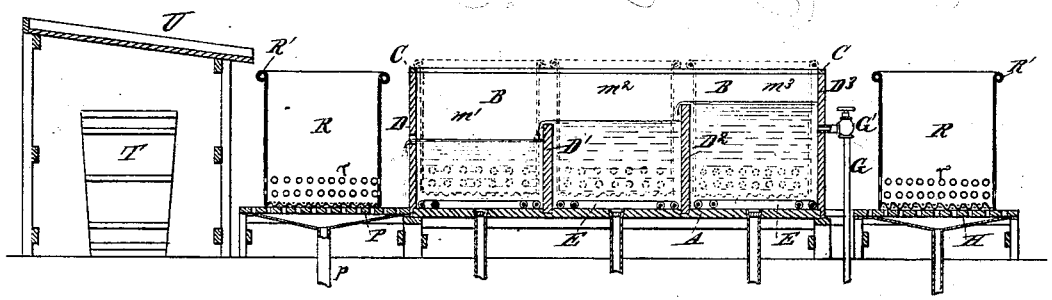

(No Model.)

J. B. GIBBS.
Dish Washer.

No. 240,404. Patented April 19, 1881.

WITNESSES
W. Colborne Brookes
Charles C. Stetson

INVENTOR
John B. Gibbs
by his attorney
F. L. Stetson

UNITED STATES PATENT OFFICE.

JOHN B. GIBBS, OF NEW YORK, N. Y.

DISH-WASHER.

SPECIFICATION forming part of Letters Patent No. 240,404, dated April 19, 1881.

Application filed April 21, 1880. (No model.)

*To all whom it may concern:*

Be it known that I, JOHN B. GIBBS, of New York city, in the State of New York, a citizen of the United States, have invented certain new and useful Improvements relating to Dish Washing, of which the following is a specification.

The invention is intended more especially for use in large hotels and dining-saloons, where the same dishes are used many times in succession, and it is required that they be rapidly, as well as thoroughly, washed, rinsed, and dried in the brief intervals. The invention may be of some service in any situation where any considerable number of dishes or analogous articles of equal or unequal size and form require to be washed.

I provide a succession of tanks, side by side, of convenient size, with provisions for heating them by steam-pipes, or otherwise, to attain and keep the required high temperature, and a number of somewhat smaller portable vessels with convenient handles and open-work bottoms, in which the dishes are skillfully placed, and are by little labor immersed successively in the entire series. The first contains water which has been several times before used and is only fit to remove the heaviest dirt. The last is very clean, and serves as a perfect rinsing. The level of the several tanks is so adjusted that the water flows of itself from the last tank into the one preceding, and so on in the direction opposite to that in which the vessel carrying the dishes is shifted. The last tank—the clean one—or the one next to it, which is but slightly dirty, is supplied with a quantity of washing-soda, (carbonate of soda,) preferably in a large lump, which will dissolve slowly and give a just sufficiently alkaline character to the water in the tank or tanks below.

The vessels in which the dishes are transferred from one tank to another and exposed in each to a succession of vigorous immersions and removals are, as before suggested, equipped with handles, which extend out horizontally beyond each side of the several tanks, to allow their being conveniently operated, one man or woman standing each side of the series of tanks and successively operating each vessel in each tank and transferring it from the filling-place just beyond the series or side to the emptying-place at the other extreme of the series. The tanks are all deeper than the vessels are allowed to sink. They are arrested, not by striking the bottom of each tank, for a sediment of solid, or partly solid, matter may gather at the bottom, but at the top rim. The top of the rim of each is equipped with a rubber fender, which receives the handles gently, and avoids shock when, as is often the case, the vessel is plunged down so rapidly as to strike the handles forcibly thereon. The bottoms of the carrying-vessels are of wire-netting very open to the motion of the water. Yet, as the dishes are liable to be spread quite horizontally over a large part of the bottom, the motion up and down through the water induces very vigorous movement of the water through small openings (auger-holes) in the sides of the vessel. These holes are provided thickly near the bottom, and the dishes being piled as open as may be to allow the access of the water to all the surfaces, a few lifts and lowers in each tank effects a thorough washing.

The accompanying drawings form a part of this specification, and represent what I consider the best means of carrying out the invention.

Figure 2:
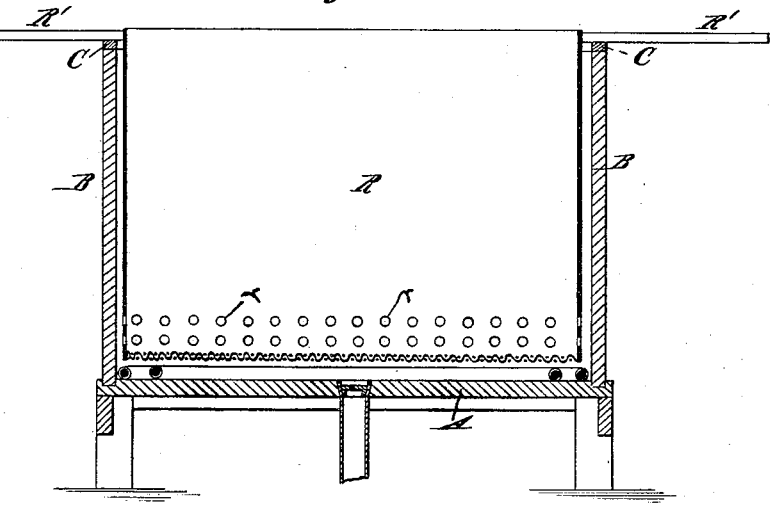

Figure 1 is a vertical section through a series of three tanks, with a filling-stand at one end and a draining-place at the other. This figure also shows a table on which the dishes are received, and on which the largest portion of their solid contents is removed, by a spoon or the like, and dropped into the tub below, as an ordinary preliminary operation. Fig. 2 is a transverse section through one of the tanks, on a larger scale, with the carrying-vessel in it resting by its handles on the elastic seats provided at the rim.

Similar letters of reference indicate like parts in all the figures.

A is a strong and tight bottom, and B B are high and tight sides bounding the whole series of tanks. I have shown only three tanks, (marked, successively, $m'$ $m^2$ $m^3$.) The partitions separating them are of graduated heights, as indicated by D D' $D^2$ $D^3$. The first, D, may have a piece above it, as shown. So, also, may all the others; but it is important to allow all the water which will ever be required to escape to flow freely over each partition. The partition $D^2$ is higher than $D'$, and so with the number succeeding.

E is a series of steam-pipes arranged in coils or otherwise in the bottom of each tank, with connections of the ordinary character for heating with steam from a boiler. (Not shown.)

G is a pipe bringing hot water from a boiler, (not shown,) controlled by a valve, $G'$. It admits the clean water in the last (the highest) tank. Each tank flows over when the carrying-vessel and its load of dishes is immersed, flows over into the next lower one, and thus transfers the water from $m^3$ to $m^2$, from $m^2$ to $m'$, and from $m'$ overboard into a grated sink, P, from whence it escapes through a drain-pipe, $p$.

R R are the bodies, and $R'$ the handles, of the carrying-vessels. I have not shown the dishes. It will be understood that care shall be expended to pile them in open tiers, so that the water, in washing strongly up and down in the vessel, and also entering in strong jets through the auger-holes $r$, shall have a fair action on the entire lot of dishes.

T is a removable tub, and U a slightly-inclined table.

H is a draining-grate, with connections for allowing the hot, wet dishes to part with the clean water brought over from the last tank, $m^3$. The dishes are removed from this, after draining a little time, in so dry a condition that they can be immediately used again without wiping.

The elastic rests are formed by short pieces or considerable lengths of rubber, as convenience may dictate. They are marked C, and appear in Fig. 1 as a continuous strip of rubber extending the whole length of the series of tanks. The screws or other fastenings (not shown) should be so disposed as to avoid the contact of the handles $R'$. They support the vessels R and their fragile contents gently, and avoid shocks, even if the dishes are raised and lowered very vigorously.

The tanks $m'$ $m^2$, &c., being of the same form as the carrying-vessels R, act to some extent piston-wise in compelling a strong motion of the water through the mass of dishes; but I do not confine the invention to the close adaption of the form and size as shown.

Modifications may be made in the forms and proportions by any good mechanic without departing from the principle or sacrificing the advantages of the invention.

The number of tanks may be increased up to ten in succession, or any other number. If reduced to two, it may be successfully used in some places.

I have made the carrying-vessels R of galvanized sheet metal, and prefer such for general practice; but they may be made of wood, and I have so described them.

The drain-pipes for finally emptying each tank may be provided with stop-cocks instead of plain plugs, as shown, or may be omitted altogether, and the tanks emptied by other means. Especially more depth may be provided below the wire-work bottoms of the several carrying-vessels. It may be of advantage to allow such in most cases.

I claim as my invention—

1. The series of tanks $m'$ $m^2$ $m^3$, arranged to overflow from each into the next, in combination with the dish holding or carrying vessels R $R'$ $r$, and with means, substantially as described, for supplying the uppermost and draining the lowermost, as herein specified.

2. The vessels R $R'$ $r$, formed with wire-work bottoms and close sides, except for the holes $r$ near the bottom, in combination with tanks $m'$ $m^2$, of corresponding form and slightly larger size, and with means, substantially as described, for supplying water from one to another, and for heating the whole, as herein set forth.

In testimony whereof I have hereunto set my hand at New York city, New York.

J. B. GIBBS.

Witnesses:
 GEO. HAZELTINE,
 GEORGETTE B. GIBBS.